US007941263B2

(12) United States Patent
Nishi et al.

(10) Patent No.: US 7,941,263 B2
(45) Date of Patent: May 10, 2011

(54) ENGINE CONTROLLER FOR WORK VEHICLE

(75) Inventors: Eiji Nishi, Kawachinagano (JP); Nobuyuki Okabe, Izumi (JP); Kenji Yoshikawa, Osaka (JP)

(73) Assignee: Kubota Corporation, Osaka (JP)

( * ) Notice: Subject to any disclaimer, the term of this patent is extended or adjusted under 35 U.S.C. 154(b) by 230 days.

(21) Appl. No.: 12/411,053

(22) Filed: Mar. 25, 2009

(65) Prior Publication Data

US 2009/0265082 A1 Oct. 22, 2009

(30) Foreign Application Priority Data

Apr. 16, 2008 (JP) ................................ 2008-106842

(51) Int. Cl.
*B60T 7/12* (2006.01)

(52) U.S. Cl. ........ 701/104; 701/103; 123/434; 123/436; 123/681

(58) Field of Classification Search .......... 701/103–105; 123/434–436, 675, 681, 687
See application file for complete search history.

(56) References Cited

U.S. PATENT DOCUMENTS 6,237,330 B1 * 5/2001 Takahashi et al. .............. 60/285
7,066,121 B2 * 6/2006 Michelini et al. .......... 123/90.11
7,072,758 B2 * 7/2006 Kolmanovsky et al. ...... 701/103
7,321,821 B2 * 1/2008 Kolmanovsky et al. ...... 701/110
7,401,606 B2 * 7/2008 Lewis et al. ................... 123/685
7,469,534 B2 * 12/2008 Nishi et al. ...................... 60/428
7,532,972 B2 * 5/2009 Kolmanovsky et al. ...... 701/105

FOREIGN PATENT DOCUMENTS

JP 08244488 9/1996

* cited by examiner

*Primary Examiner* — John T Kwon
(74) *Attorney, Agent, or Firm* — The Webb Law Firm

(57) ABSTRACT

An engine controller (76) includes a first mode control module (81) for performing a first mode control in which a fuel injection amount in an engine (1) is obtained based on a first torque-engine rotational speed characteristic, and a second mode control module (82) for performing a second mode control in which the fuel injection amount is obtained based on a second torque-engine rotational speed characteristic. The first mode control module (81) has a first engine load estimation part (81*a*) for estimating an engine load based on a difference in rotational speed between a non-load engine rotational speed and an actual engine rotational speed, and the second mode control module (82) has a second engine load estimation part (82*a*) for estimating an engine load based on the fuel injection amount.

6 Claims, 8 Drawing Sheets

ENGINE CONTROLLER FOR WORK VEHICLE

BACKGROUND OF THE INVENTION

1. Field of the Invention

The present invention relates to an engine controller for a work vehicle connected to: an operation position detection sensor configured to detect an operation position of an acceleration manually operating device; a rotational speed sensor configured to detect a rotational speed of an engine; and a fuel injection control unit configured to control a fuel injection amount in the engine.

2. Description of the Related Art

A tractor as one example of work vehicle generally has an acceleration manually operating device (e.g., accelerator hand lever and accelerator pedal), a fuel injection control unit configured to control a fuel injection amount in an engine, and a rotational speed sensor configured to detect a rotational speed of the engine. An engine controller is configured to operate the fuel injection control unit, based on a torque curve characteristic in which a rotational speed of the engine changes along with a change in torque. Such an engine controller has an all-speed governor function, a load control function and a droop control function.

The torque curve characteristic is obtained in advance as a relationship between the rotational speed of the engine and a torque as a parameter for calculating a control amount to be sent to the fuel injection control unit, and stored in a form of a table. From this table, a relationship between a torque for each operation position of the acceleration operating device and an engine rotational speed can be extracted. With this configuration, when the acceleration operating device is shifted to a certain operation position, a control amount of the fuel injection control unit of the engine can be determined with reference to the torque curve characteristic, based on a torque value corresponding to the certain operation position and a detected value at a time point by the rotational speed sensor (actual rotational speed of the engine). Based on this control amount, the fuel injection control unit controls a fuel injection mechanism so that a requested fuel injection amount is attained.

Applicant previously has developed a tractor with a controller utilizing the above-described control technique (see Japanese unexamined patent application publication No. 8-244488). The controller of this tractor calculates a difference between a non-load rotational speed of the engine for an operation position of the acceleration operating device (defined for each operation position) and a detected value by the rotational speed sensor (actual rotational speed of the engine), and the difference in rotational speed is used as an estimation value of a load on the engine. In addition, upon operating a transmission mechanism for traveling, the difference in rotational speed, ultimately the engine load, is utilized (specifically, a predetermined low pressure P3 of the hydraulic clutch is determined based on the difference in rotational speed (see paragraphs [0045]-[0047] and FIGS. 6 and 7 of Japanese unexamined patent application publication No. 8-244488)).

Recently, proposals have been made to introduce to a work vehicle a controller for operating the fuel injection control unit of the engine, which has a control function based on a torque curve characteristic in which a change in rotational speed of the engine along with a change in torque is small, or a torque curve characteristic in which the rotational speed of the engine does not change along with the change in torque, i.e., an isochronous control function. When the isochronous control function is realized, a working device (e.g., roll baler for pasture) using an engine as a power source can be installed, which may otherwise not exert a predetermined performance when the rotational speed of the engine changes. In this case, when various control functions with completely different control configurations, such as a droop control function and an isochronous control function, are to be performed, it is important to appropriately obtain a load on the engine.

Therefore, it would be desirable to provide an engine controller which has a plurality of control modes for controlling a fuel injection control unit, and is capable of appropriately estimating a load on the engine.

SUMMARY OF THE INVENTION

In one aspect of the present invention, there is provided an engine controller for a work vehicle connected to: an operation position detection sensor configured to detect an operation position of an acceleration manually operating device; a rotational speed sensor configured to detect a rotational speed of an engine; and a fuel injection control unit configured to control a fuel injection amount in the engine, the controller including: a first mode control module configured to perform a first mode control in which the fuel injection amount is obtained based on a first torque-engine rotational speed characteristic; a second mode control module configured to perform a second mode control in which the fuel injection amount is obtained based on a second torque-engine rotational speed characteristic in which a change in rotational speed along with a change in torque is smaller than that of the first torque-engine rotational speed characteristic; a control mode management unit configured to make a selection between the first mode control and the second mode control; a difference computing unit configured to compute a difference in rotational speed between a non-load engine rotational speed for the operation position detected by the operation position detection sensor and the engine rotational speed from the rotational speed sensor, the non-load engine rotational speed being defined for each operation position; a first engine load estimation part configured to estimate an engine load based on the difference in rotational speed, while the first mode control is performed; and a second engine load estimation part configured to estimate an engine load based on the fuel injection amount, while the second mode control is performed.

With this configuration, for a normal on-road driving and traveling for working, a first mode control is set. In the first mode control, the first torque-engine rotational speed characteristic is set in accordance with a certain operation position of the acceleration operating device, and a fuel injection amount in the engine is controlled based on the detected value by the rotational speed sensor (actual rotational speed of the engine) with reference to the first torque-engine rotational speed characteristic in which the rotational speed of the engine changes along with a change in torque.

In the first mode control, a difference in rotational speed is generated between a non-load engine rotational speed for the operation position of the acceleration operating device (defined for each operation position) and a detected value by the rotational speed sensor (actual rotational speed of the engine), and this difference is obtained as a load on the engine (for example, when the difference in rotational speed is large, it is determined that the load on the engine is large, and when the difference in rotational speed is small, it is determined that the load on the engine is small).

In addition, in the case where a working device (e.g. roll baler for pasture) is used which may not exert a predetermined performance when the rotational speed of the engine fluctuates, a second mode control is set. In the second mode control, the fuel injection amount in the engine is controlled based on a non-load engine rotational speed for the operation position of the acceleration operating device (so as to retain the non-load engine rotational speed for a certain operation position of the acceleration operating device), with reference to the second torque-engine rotational speed characteristic in which a change in rotational speed of the engine along with a change in torque is smaller than that of the first torque-engine rotational speed characteristic.

In the second mode control, almost no difference in rotational speed is generated between a non-load engine rotational speed for the operation position of the acceleration operating device and a detected value by the rotational speed sensor (actual rotational speed of the engine), and therefore, it is impossible to detect this difference as a load on the engine. However, in the second mode control, the fuel injection amount fluctuates, and thus a load on the engine is obtained based on the fuel injection amount (for example, when the fuel injection amount is large, it is determined that the load on the engine is large, and when the fuel injection amount is small, it is determined that the load on the engine is small).

For the purpose of making the above-mentioned effect more efficient, the second mode control is preferably an isochronous control with a torque-engine rotational speed characteristic in which an engine rotational speed is not reduced along a change in torque between the non-load torque and the maximum torque. With this configuration, the operation of the transmission mechanism for traveling based on a load on the engine can be appropriately performed.

The second mode control, such as isochronous control, is generally stable when the acceleration operating device is not frequently operated, and it may not be stably operated when the acceleration operating device is relatively frequently operated, such as on-load driving. On the other hand, the first mode control is stably performed, when the acceleration operating device is relatively frequently operated.

In view of the above, in one preferable embodiment of the present invention, the engine controller further includes an operational behavior evaluation unit configured to evaluate an operational behavior of the acceleration operating device based on a detection signal by the operation position detection sensor when the operational behavior evaluation unit determines that an operation amount per unit time of the acceleration operating device is large, the first mode control is forcibly selected, and when the operational behavior evaluation unit determines that the operation amount per unit time of the acceleration operating device is small, the second mode control is forcibly selected.

According to this configuration, for example, when the operation amount per unit time of the acceleration operating device is large, the operational behavior evaluation unit determines that the acceleration operating device is relatively frequently operated, and the first mode control is automatically set. On the other hand, when the operation amount per unit time of the acceleration operating device is small, the operational behavior evaluation unit determines that the acceleration operating device is not frequently operated, and the second mode control is automatically set. In this manner, in accordance with the operational state of the acceleration operating device, the first mode control or second mode control is automatically and appropriately set.

BRIEF DESCRIPTION OF THE DRAWINGS

FIG. 3 is a hydraulic circuit diagram of forward and reverse clutches, first and second main transmission mechanisms and the like.

DETAILED DESCRIPTION OF THE PREFERRED EMBODIMENTS

Hereinbelow, a preferable embodiment of the present invention will be described with reference to the attached drawings. Features of one embodiment may be combined with features of other embodiments, and such combinations are included in the scope of the present invention, as long as they retain coherency.

Figure 1:
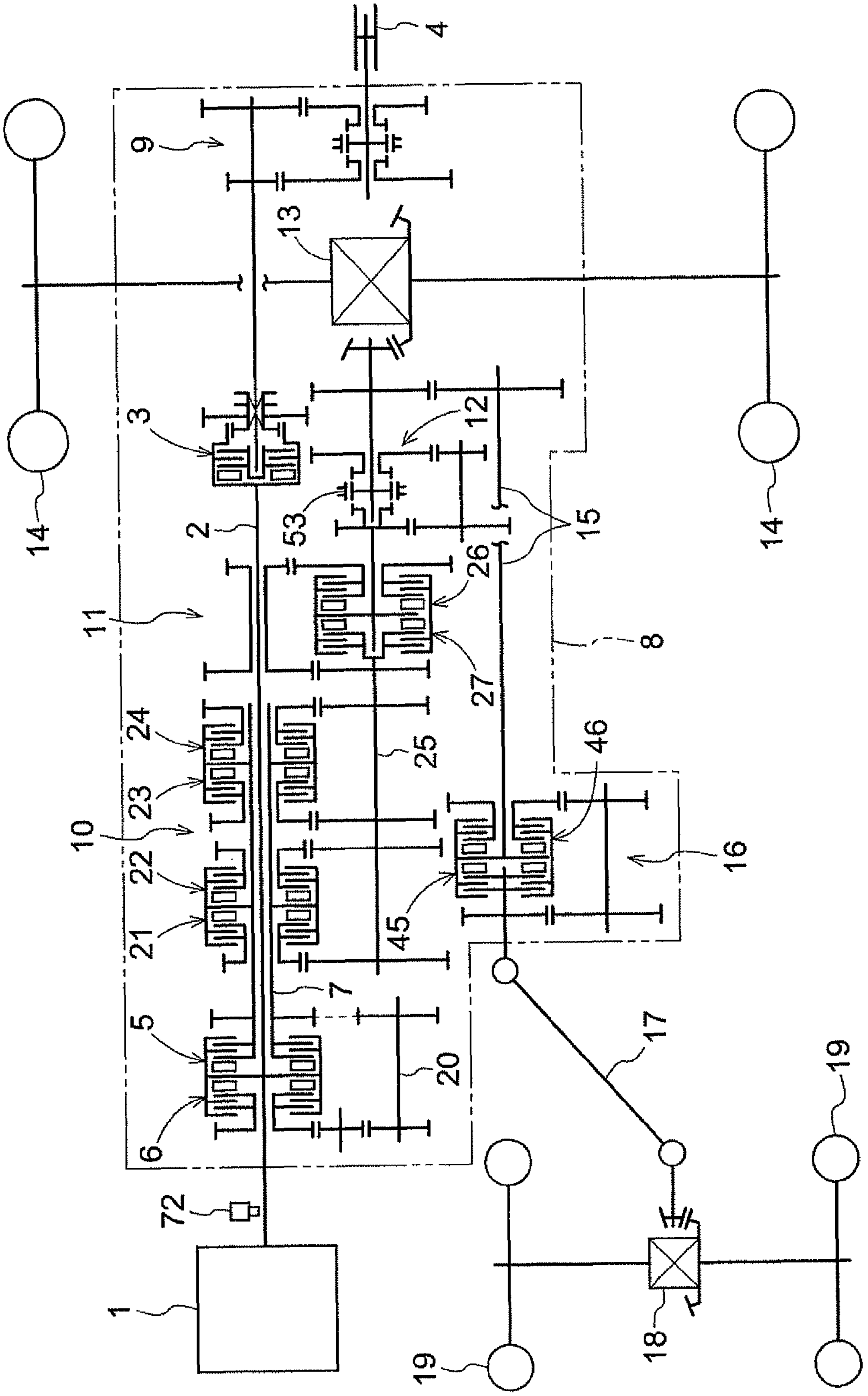
FIG. 1 is a schematic view of a transmission system in a transmission case.

FIG. 1 shows a power transmission system built in a transmission case 8 of a four-wheel drive type tractor (as an example of a work vehicle). In this system, power of an engine 1 is transmitted to rear wheels 14, through a forward clutch 5 or reverse clutch 6, a cylindrical shaft 7, a first main transmission mechanism 10 (corresponding to a transmission mechanism for traveling), a second main transmission mechanism 11, an auxiliary transmission mechanism 12 and a rear wheel differential device 13. Power branched immediately upstream of the rear wheel differential device 13 is transmitted to front wheels 19, through a transmission shaft 15, a hydraulic clutch type front wheel transmission 16, a front wheel transmission shaft 17 and a front wheel differential device 18. The power of the engine 1 is also transmitted to a PTO shaft 4, through a transmission shaft 2, a hydraulic multiple-disc PTO clutch 3 and a PTO transmission mechanism 9.

As shown in FIG. 1, the forward clutch 5 and the reverse clutch 6 are of hydraulic multiple-disc type in which friction plates (not shown) and pistons (not shown) are assembled, each of which is biased to a cut-off state and is switchable to a transmission state by supplying operating oil. When the forward clutch 5 is in a transmission state, the power of the engine 1 is directly transmitted from the forward clutch 5 to the cylindrical shaft 7, so that a vehicle body travels frontward. When the reverse clutch 6 is in a transmission state, the power of the engine 1 is transmitted in an inversely rotating manner through the reverse clutch 6 and a transmission shaft 20 to the cylindrical shaft 7, so that the vehicle body travels rearward.

As shown in FIG. 1, the first main transmission mechanism 10 has four hydraulic multiple-disc type clutches, including a first speed clutch 21, a second speed clutch 22, a third speed clutch 23 and a fourth speed clutch 24 arranged adjacent to each other, so that the transmission is variable in four speeds. By operating one of the speed clutches 21-24 to a transmission state, the power of the cylindrical shaft 7 is varied to corresponding one of four speeds, and transmitted to a transmission shaft 25. Each of the speed clutches 21-24 is biased to a cut-off state and is switchable to a transmission state by supplying operating oil.

As shown in FIG. 1, the second main transmission mechanism 11 has composed of two hydraulic multiple-disc type clutches, including a low-speed clutch 26 (corresponding to a hydraulic clutch for traveling), and a high-speed clutch 27 (corresponding to a hydraulic clutch for traveling) arranged adjacent to each other. By operating one of the low-speed clutch 26 and high-speed clutch 27 to a transmission state, the power of the transmission shaft 25 is varied to corresponding one of two speeds, and transmitted to the auxiliary transmission mechanism 12. Each of the low-speed clutch 26 and high-speed clutch 27 is biased to a cut-off state and is switchable to a transmission state by supplying operating oil.

Figure 2:
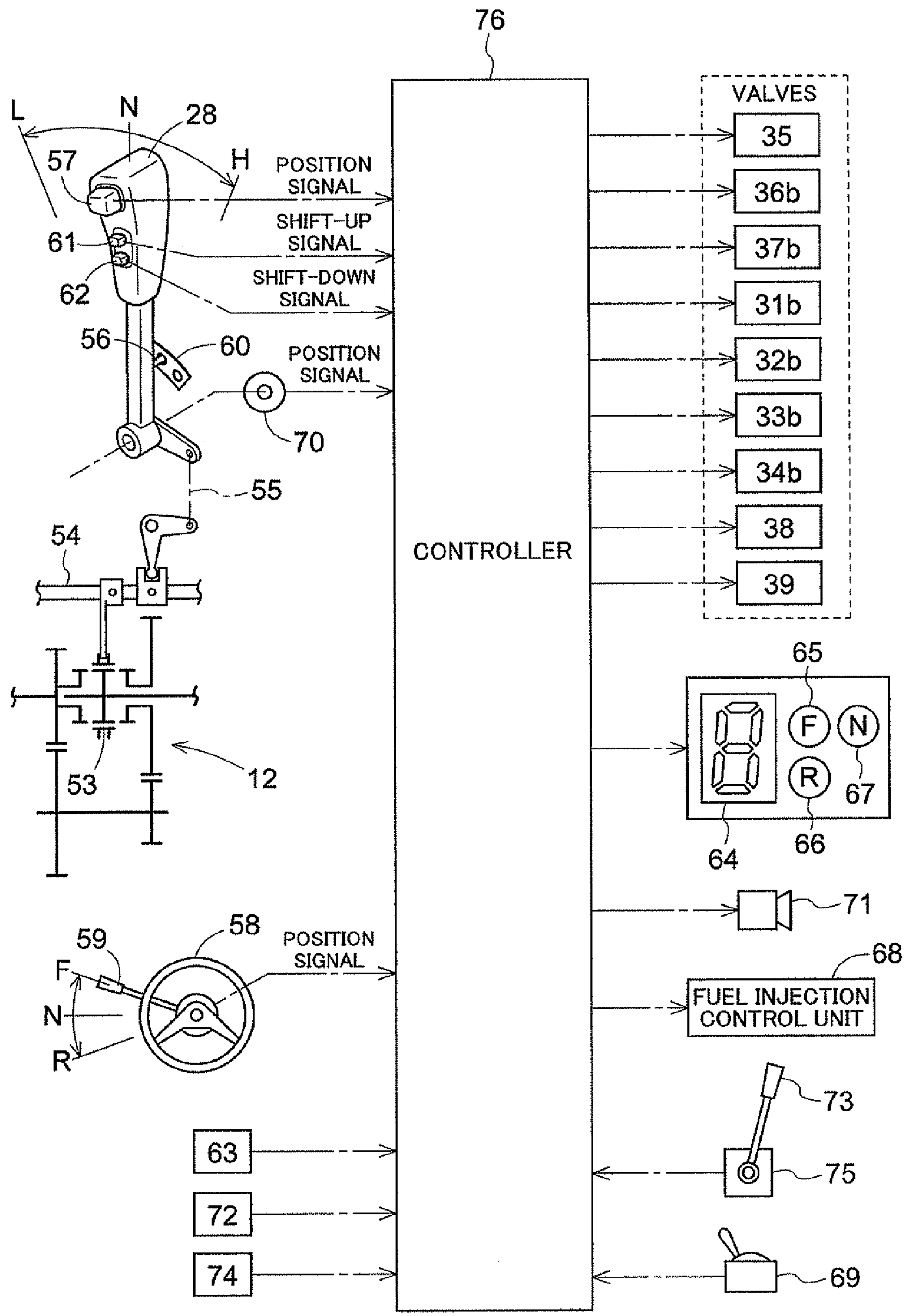
FIG. 2 is a block diagram of a control system.

The auxiliary transmission mechanism 12 is configured as a synchromesh type in which a shift member 53 is slidably operated, and thus speed thereof is variable in two speeds, and is mechanically operated with a shift lever 28 shown in FIG. 2.

Next, a hydraulic circuit for the forward clutch 5, reverse clutch 6, first main transmission mechanism 10 and second main transmission mechanism 11 will be described.

Figure 3:
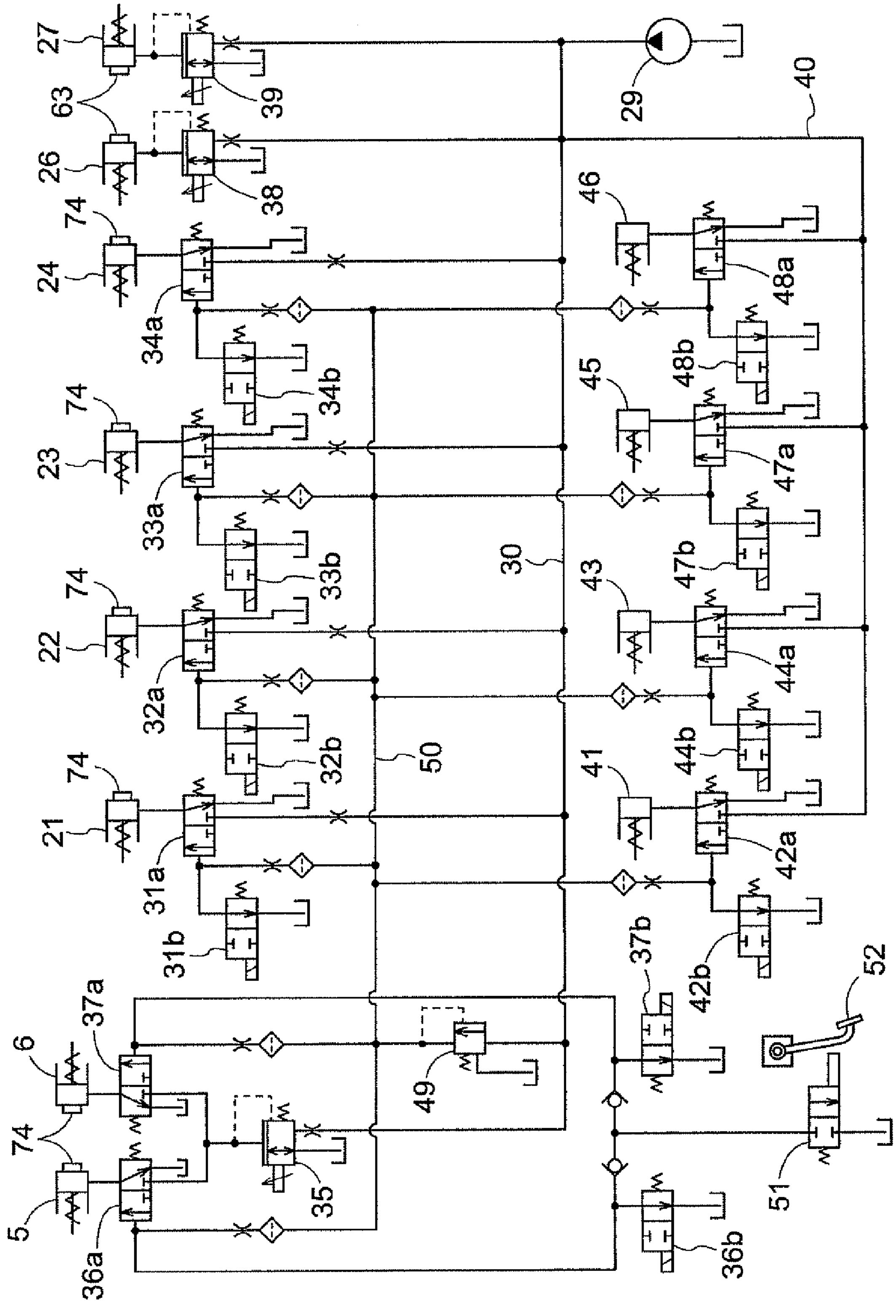

As shown in FIG. 3, to an oil passage 30 from a pump 29 are connected a solenoid proportional valve 35 and pilot-operated type switching valves 36*a*,37*a* for the forward clutch 5 and reverse clutch 6; pilot-operated type switching valves 31*a*,32*a*,33*a*,34*a* for the first, second, third and fourth speed clutches 21, 22, 23 and 24, respectively; and solenoid proportional valves 38,39 for the low-speed clutch 26 and high-speed clutch 27.

As shown in FIG. 3, to an oil passage 40 branched from the oil passage 30 are connected a pilot-operated type switching valve 42*a* corresponding to a hydraulic clutch 41 for differential lock operation in the front wheel differential device 18; a pilot-operated type switching valve 44*a* corresponding to a hydraulic clutch 43 for differential lock operation in the rear wheel differential device 13; and pilot-operated type switching valves 47*a*,48*a* for a standard clutch 45 and a speed-increasing clutch 46 of the front wheel transmission 16. Each of the switching valves 31*a*-34*a*,36*a*,37*a*,42*a*,44*a*,47*a*,48*a* is biased to an oil-drain position (cut-off state) by a spring, and is switchable to a supply position (transmission state) by supplying a pilot pressure.

As shown in FIG. 3, a pilot oil passage 50 is branched from the oil passage 30 through a pressure reducing valve 49. The pilot oil passage 50 is connected to operation parts of the respective switching valves 31*a*-34*a*,36*a*,37*a*,42*a*,44*a*,47*a*, 48*a*, and to the operation parts are connected the respective solenoid valves 31*b*-34*b*,36*b*,37*b*,42*b*,44*b*,47*b*,48*b*. Each of the solenoid valves 31*b*-34*b*,36*b*,37*b*,42*b*,44*b*,47*b*,48*b* is biased to an oil-drain position (cut-off state) by a spring. With respect each of the solenoid valves 31*b*-34*b*,36*b*,37*b*,42*b*, 44*b*,47*b*,48*b*, when at a supply position, a pilot pressure is supplied to an operation part of the corresponding switching valve (31*a*-34*a*,36*a*,37*a*,42*a*,44*a*,47*a*,48*a*) so that the corresponding switching valve (31*a*-34*a*,36*a*,37*a*,42*a*,44*a*,47*a*, 48*a*) is switchable to a supply position (transmission state).

It should be noted that, as schematically shown in FIG. 2, the solenoid proportional valve 35, the solenoid valves 31*b*-34*b*,36*b*,37*b*,42*b*,44*b*,47*b*,48*b* and the solenoid proportional valves 38,39 are operated through control signals from a controller 76.

Next, structures of operating parts for the forward clutch 5, reverse clutch 6, first main transmission mechanism 10 and second main transmission mechanism 11 will be described.

As shown in FIG. 3, in this circuit, an on-off valve 51 capable of draining pilot pressure oil from the operating parts for the switching valves 36*a*,37*a* is disposed, and is biased to a close position. A clutch pedal 52 for opening the on-off valve 51 is also disposed. As shown in FIG. 2, on a base portion of a steering wheel 58 for the front wheels 19, there is provided a forward-reverse lever 59 operable switchably among a forward position F, a reverse position R and a neutral position N, and an operation position of the forward-reverse lever 59 (as a forward-reverse lever position signal) is input to the controller 76.

As schematically shown in FIG. 2, the shift lever 28 supported swingably about a lateral axis of the operation part of the vehicle body and a shift shaft 54 capable of slidably operating a shift member 53 of the auxiliary transmission mechanism 12 are mechanically linked through a linkage mechanism 55. When the shift lever 28 is shifted to a neutral position N, a low-speed position L and a high-speed position H, the auxiliary transmission mechanism 12 (shift member 53) is shifted to a neutral position, a low-speed position and a high-speed position, respectively. A position sensor 70 for detecting an operation position of the shift lever 28 is also provided, and a detection signal of the position sensor 70 (shift lever position signal) is input to the controller 76.

As shown in FIG. 2, on a lateral side of the shift lever 28, a lock pin 56 is retractably provided, and on an upper portion of the shift lever 28, a manual operation button 57 is provided which can operate protrusion and retraction of the lock pin 56. The operation position of the manual operation button 57 (as a manual operation button position signal) is input to the controller 76. The lock pin 56 is biased to a protruding side (right side in FIG. 2) by a spring (not shown) (the manual operation button 57 is also biased to a protruding side (left side in FIG. 2)). By engaging the lock pin 56 to a fixed guide plate 60, the shift lever 28 is held to the neutral position N, the low-speed position L or the high-speed position H. When the manual operation button 57 is pushed, the lock pin 56 is retracted, which enables the operation of the shift lever 28 to the neutral position N, the low-speed position L or the high-speed position H.

As shown in FIG. 2, on a left lateral side of the shift lever 28, a shift-up button 61 and a shift-down button 62 are arranged in a vertical direction, and operation signals of the shift-up button 61 and shift-down button 62 (shift-up operation signal and shift-down operation signal) are input to the controller 76. When the shift-up button 61 or shift-down button 62 is pushed, as will be described later, the first and the second main transmission mechanisms 10,11 are operated based on the control signals from the controller 76.

As shown in FIG. 2, to the controller 76 are connected a shift change display 64 with seven segments configured to display a shift position (first speed to eighth speed) for the first and second main transmission mechanisms 10,11; a forward lamp 65 and a reverse lamp 66 configured to indicate which of the forward clutch 5 and the reverse clutch 6 is in a transmission state; and a neutral lamp 67 configured to indicate that the shift lever 28 or the forward-reverse lever 59 is at the neutral position N. Though not shown, these output devices are provided in an operation part of the tractor. As shown in FIGS. 2 and 3, a buzzer 71 and a pressure sensor 74 configured to detect a working pressure of the forward clutch 5 and reverse clutch 6 is provided, and a detection signal of the pressure sensor 74 is input to the controller 76. In accordance with the control signal from the controller 76 based on the detection signal, the shift change display 64, the forward clutch 5, the reverse clutch 6, the neutral lamp 67 and the buzzer 71 are operated.

The controller 76 also generates and outputs a control amount to a fuel injection control unit 68 configured to control a fuel injection amount in the engine 1.

Figure 4:
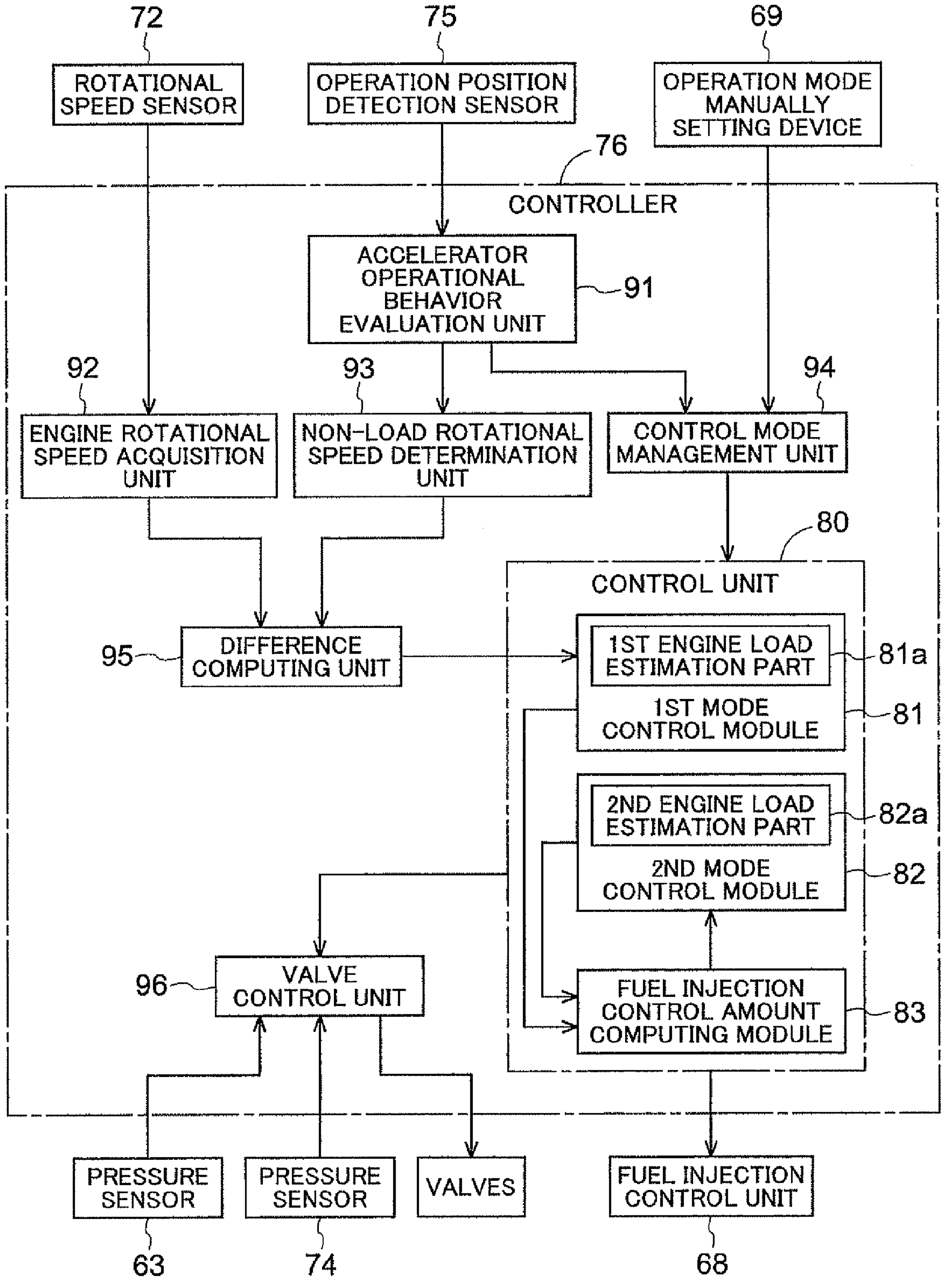
FIG. 4 is a block diagram of an engine controller.

The controller 76 is formed of hardware and/or software, with a computer unit as a center member. Main functions created therein are schematically shown in FIG. 4. First, a control unit 80 which serves a central function of the controller 76 includes: a first mode control module 81 configured to perform a first mode control in which a fuel injection amount in the engine is computed based on a first torque-engine rotational speed characteristic; a second mode control module 82 configured to perform a second mode control in which the fuel injection amount is computed based on a second torque-engine rotational speed characteristic in which a change in rotational speed along with a change in torque is smaller than that of the first torque-engine rotational speed characteristic; and a fuel injection control amount computing module 83 configured to output a control amount to the fuel injection control unit 68. In addition, the first mode control module 81 has a first engine load estimation part 81*a* configured to estimate, during the first mode control, an engine load in accordance with the difference in rotational speed, and the second mode control module 82 has a second engine load estimation part 82*a* configured to estimate, during the second mode control, an engine load in accordance with the fuel injection amount. It should be noted that, in the present embodiment, the second mode control is an isochronous control with a torque-engine rotational speed characteristic in which an engine rotational speed is not reduced along a change in torque between the non-load torque and the maximum torque.

A system for processing input signals includes an accelerator operational behavior evaluation unit 91, an engine rotational speed acquisition unit 92, a non-load rotational speed determination unit 93 and a control mode management unit 94. The accelerator operational behavior evaluation unit 91 is configured to evaluate operational behaviors of an acceleration operating device 73 in accordance with a detection signal from an operation position detection sensor 75. The engine rotational speed acquisition unit 92 is configured to calculate an engine rotational speed in accordance with a signal from a rotational speed sensor 72. The non-load rotational speed determination unit 93 is configured to determine a non-load engine rotational speed for a certain operation position detected by the operation position detection sensor 75. The control mode management unit 94 is configured to make a selection between a control by the first mode control module and a control by the second mode control module.

In addition, the controller 76 further includes a difference computing unit 95 and a valve control unit 96. The difference computing unit 95 is configured to compute a difference in rotational speed between the engine rotational speed calculated by the engine rotational speed acquisition unit 92 and the non-load engine rotational speed determined by the non-load rotational speed determination unit 93. The valve control unit 96 is configured to operate various values described above, in accordance with control signals from the pressure sensors 63, 74 and the control unit 80.

The controller having such a structure can perform various controls, including representative controls as below:

(1) When the operational behavior evaluation unit 91 determines that an operation amount per unit time of the acceleration operating device 73 is large, a control by the first mode control module 81 is forcibly selected.

(2) When the operational behavior evaluation unit 91 determines that an operation amount per unit time of the acceleration operating device 73 is small, a control by the second mode control module 82 is forcibly selected.

(3) When it is determined that there is a rapid acceleration or deceleration during the second mode control, the first engine load estimation part 81*a* estimates an engine load.

(4) When the fuel injection amount is in its maximal domain during the second mode control, the first engine load estimation part 81*a* estimates an engine load.

(5) When a mode manually setting device 69 is provided, the control mode management unit 94 makes a selection based on mode setting information from the mode setting device 69, between a control by the first mode control module 81 and a control by the second mode control module 82.

Figure 5:
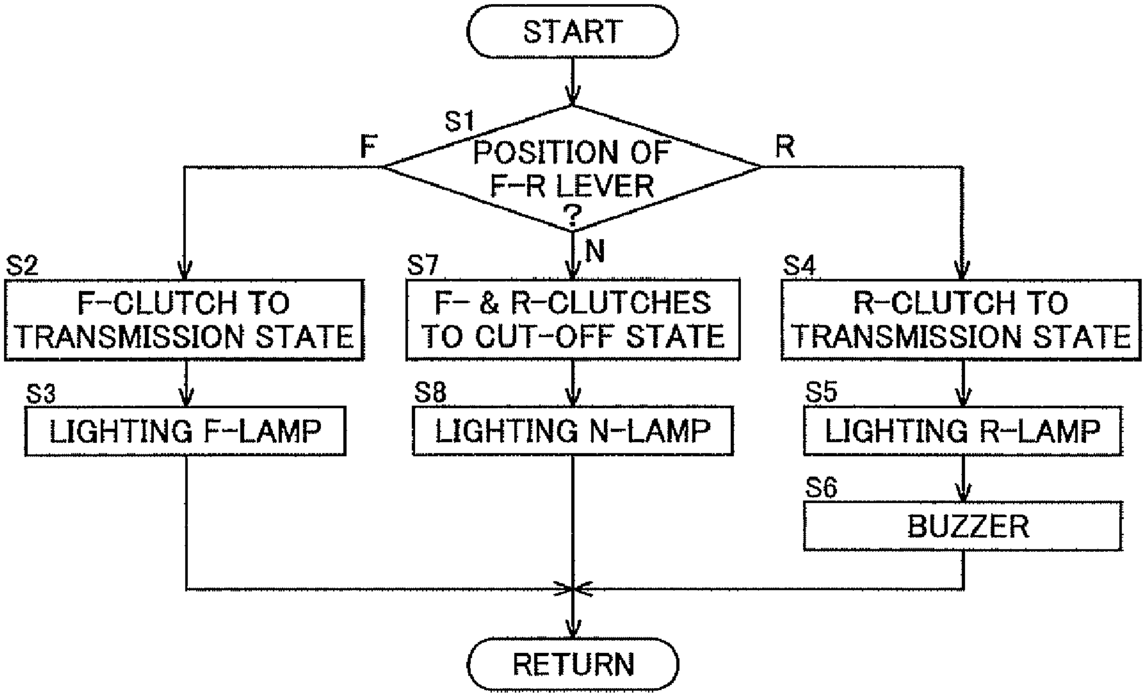
FIG. 5 is a flowchart showing a flow of control when a forward-reverse lever is operated.

Next, an operation of the forward-reverse lever 59 will be described with reference to a flowchart of FIG. 5.

When the forward-reverse lever 59 is at the forward position F (step S1), the solenoid valve 36*b* is supplied with an operating current to shift the switching valve 36*a* to a supply position, by which the forward clutch 5 is shifted to a transmission state (step S2), and the forward lamp 65 is lit (step S3). When the forward-reverse lever 59 is at the reverse position R (step S1), the solenoid valve 37*b* is supplied with an operating current to shift the switching valve 37*a* to a supply position, by which the reverse clutch 6 is shifted to a transmission state (step S4), the reverse lamp 66 is lit (step S5), and the buzzer 71 is intermittently activated (step S6).

When the forward-reverse lever 59 is at the neutral position N (step S1), operating currents to the solenoid valves 36*b*,37*b* are cut off to shift the switching valves 36*a*,37*a* to the respective oil-drain positions, by which the forward clutch 5 and reverse clutch 6 are shifted to the respective cut-off states (step S7), and the neutral lamp 67 is lit (step S8). When a pressure is applied to the clutch pedal 52, the on-off valve 51 is shifted to an open position and the switching valves 36*a*, 37*a* are shifted to the respective oil-drain positions, by which the forward clutch 5 and reverse clutch 6 are shifted to the respective cut-off states and the neutral lamp 67 is lit. In this manner, when both of the forward clutch 5 and the reverse clutch 6 are in cut-off state, power transmission is cut-off at the forward clutch 5 and reverse clutch 6, which stops traveling of the vehicle body.

Next, the first mode control module 81 (configured to perform an all-speed governor mode, a load control mode and a droop control mode) and second mode control module 82 (configured to perform an isochronous control mode) for operating the fuel injection control unit 68 configured to control the fuel injection amount in the engine 1 will be described.

As shown in FIG. 2, the control system includes the accelerator hand lever (acceleration manually operating device) 73, the potentiometer type gate opening sensor (operation position detection sensor) 75 configured to detect an operation position of the accelerator hand lever 73, and the rotational speed sensor 72 configured to detect an actual rotational speed N2 of the engine 1, and detected values by the gate opening sensor 75 and rotational speed sensor 72 are input to the controller 76.

Figure 6:
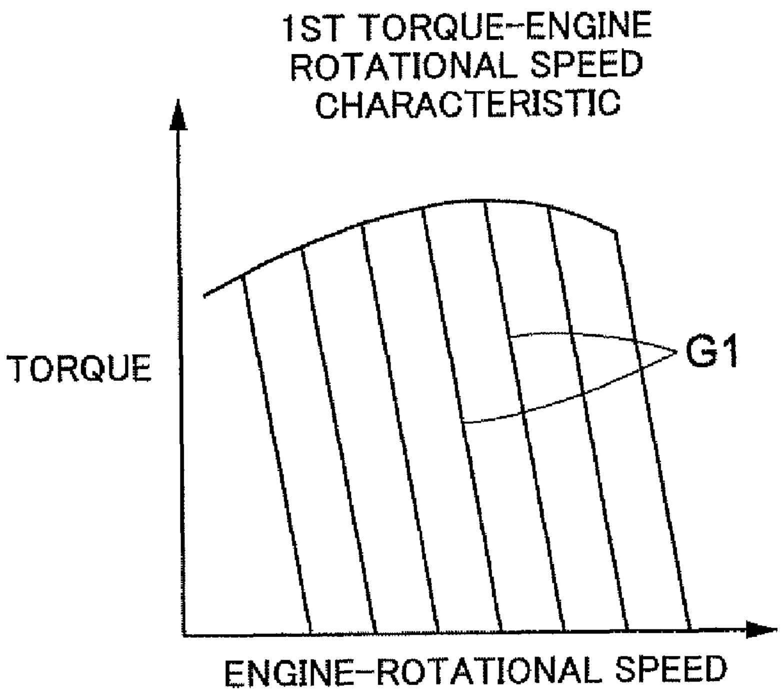
FIG. 6 is a diagram showing a first characteristic of torque-engine rotational speed.

As shown in FIG. 6, a first torque-engine rotational speed characteristic represented by a first torque-engine rotational speed curve G1, in which the rotational speed of the engine 1 changes along with a change in torque, is included in the first mode control module 81 configured to operate the fuel injection control unit 68 through the fuel injection control amount computing module 83 based on the first torque-engine rotational speed characteristic. The first torque-engine rotational speed curve G1 is obtained in advance as a relationship between the rotational speed of the engine 1 and an operation position (torque) of the fuel injection control unit 68 and is set for each operation position of the accelerator hand lever 73.

Figure 7:
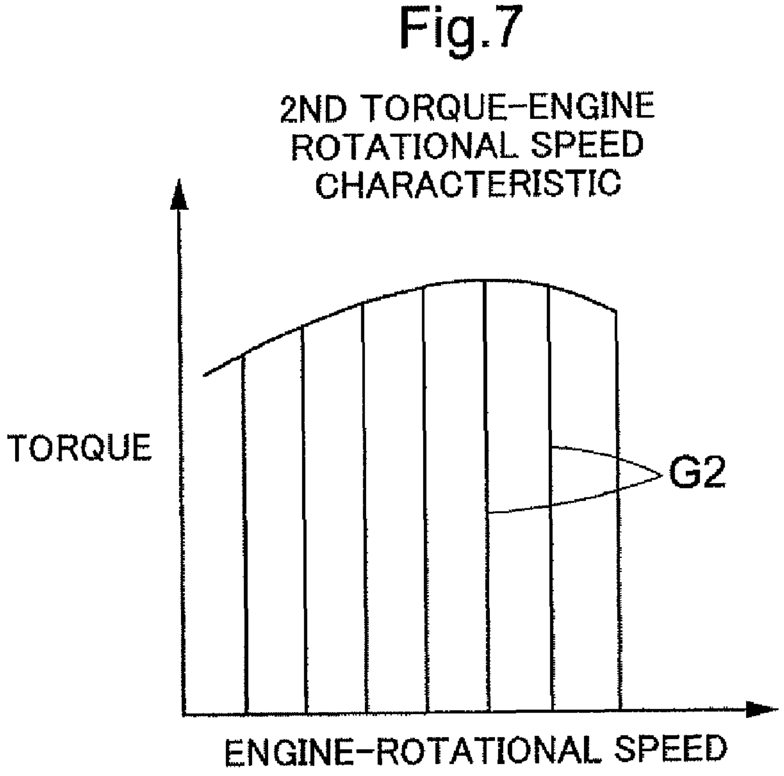
FIG. 7 is a diagram showing a second characteristic of torque-engine rotational speed.

As shown in FIG. 7, a second torque-engine rotational speed characteristic represented by a second torque-engine rotational speed curve G2, in which a change in rotational speed of the engine 1 along with a change in torque is smaller than that of the first torque-engine rotational speed characteristic (first torque-engine rotational speed curve G1), or a second torque-engine rotational speed curve G2, in which the rotational speed of the engine 1 does not change along with a change in torque, is included in the second mode control module 82 (isochronous control module) configured to operate the fuel injection control unit 68 through the fuel injection control amount computing module 83 based on the second torque-engine rotational speed characteristic. The second torque-engine rotational speed curve G2 is obtained in advance as a relationship between the rotational speed of the engine I and an operation position (torque) of the fuel injection control unit 68 and is set for each operation position of the accelerator hand lever 73. Flows of control in accordance with signals from the mode manually setting device 69 and the shift lever 28 will be described with reference to flowcharts of FIGS. 8 and 9.

Figure 8:
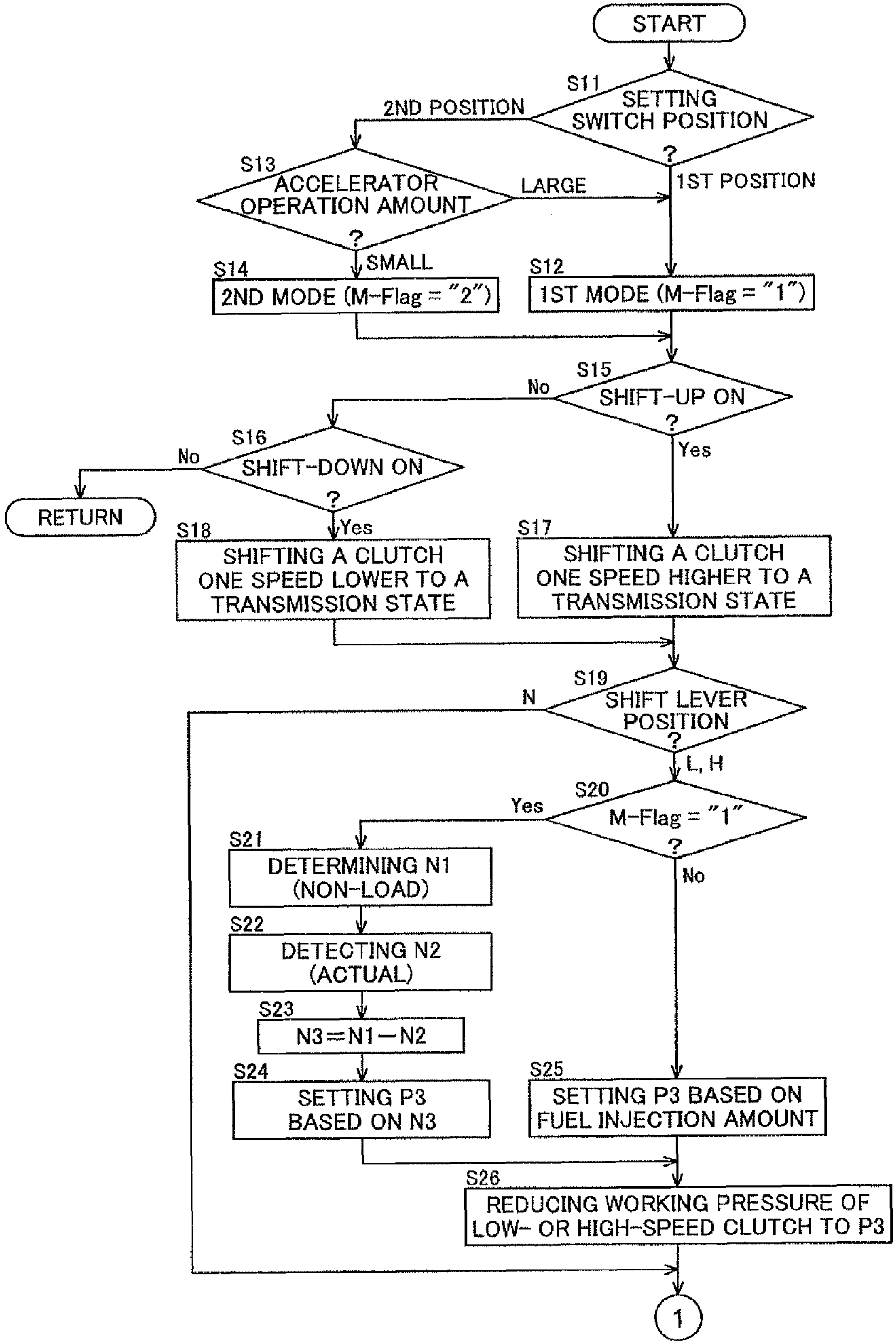
FIG. 8 is a flowchart showing a first half of a flow of control when a shift-up button or shift-down button is operated.
Figure 9:
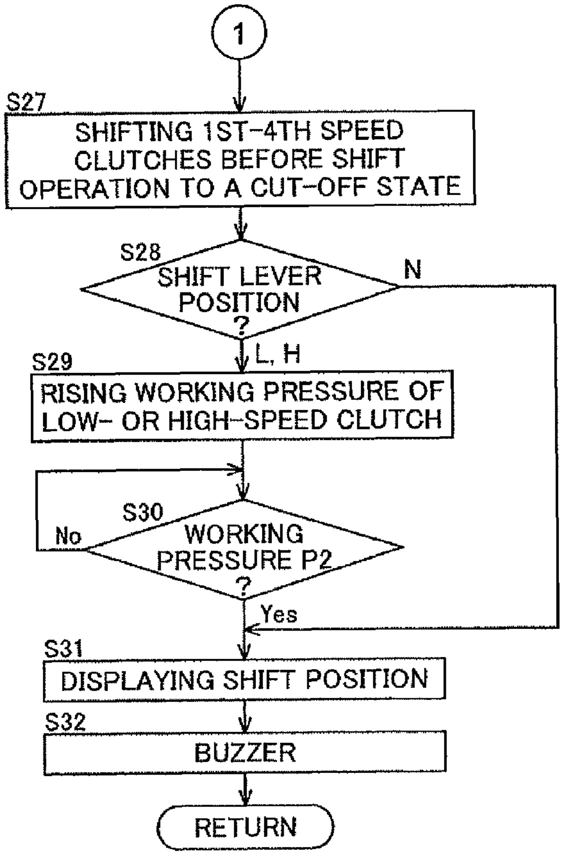
FIG. 9 is a flowchart showing a second half of the flow of control when the shift-up button or shift-down button is operated.

As shown in FIG. 8, when the setting switch (mode setting device) 69 is at a first position (step S11), regardless of whether or not the accelerator hand lever 73 is operated, the first mode control module 81 is activated to thereby stop the second mode control module (isochronous control module) 82 and in order to record that the first mode was selected, an M-Flag is set to "1" (step S12).

In this situation, the first torque-engine rotational speed curve G1 is set in accordance with a certain operation position of the accelerator hand lever 73, and a control amount for the fuel injection control unit 68 is obtained using a detected value by the rotational speed sensor 72 (actual rotational speed of the engine 1) with reference to the first torque-engine rotational speed curve G1, and based on the obtained control amount, the fuel injection control unit 68 is operated.

When the setting switch 69 is at a second position (step S11), the second mode control module 82 (isochronous control module) is activated to thereby stop the first mode control module 81 and in order to record that the second mode was selected, the M-Flag is set to "2" (step S14). In this situation, the second torque-engine rotational speed curve G2 is set in accordance with a certain operation position of the accelerator hand lever 73, and a control amount for the fuel injection control unit 68 is obtained with reference to the second torque-engine rotational speed curve G2, and based on the obtained control amount, the fuel injection control unit 68 is operated.

In other words, when the setting switch 69 is at a second position (step S11) and the accelerator hand lever 73 is not operated (an operation amount per unit time of the accelerator hand lever 73 is smaller than a set value) (step S13), the processing is advanced to a step S14, at which the second mode control module 82 (isochronous control module) is activated and the first mode control module 81 is stopped.

On the other hand, when the accelerator hand lever 73 is operated (an operation amount per unit time of the accelerator hand lever 73 is lager than the set value) (step S13), the processing is advanced to a step S12, at which the first mode control module 81 is activated and the second mode control module 82 (isochronous control module) is stopped.

Next, a first half of operation of the first main transmission mechanism 10 and second main transmission mechanism 11 by pressing the shift-up button 61 or shift-down button 62 will be described.

As shown in FIG. 1, since the first main transmission mechanism 10 is shiftable in four speeds and the second main transmission mechanism 11 is shiftable in two speeds, a combination of the first main transmission mechanism 10 and second main transmission mechanism 11 is shiftable in eight speeds. When the low-speed clutch 26 is in a transmission state, the first-fourth speed clutches 21-24 correspond to shift positions for the first-fourth speeds, and when the high-speed clutch 27 is in a transmission state, the first-fourth speed clutches 21-24 correspond to shift positions for the fifth-eighth speeds.

Each of the first speed-fourth speed clutches 21-24, and low-speed and high-speed clutches 26,27 is provided with the pressure sensor 63 or 74 configured to detect a corresponding working pressure. With the detection of the pressure sensors 63,74, the shift position (first-eighth speed) at present of a combination of the first main transmission mechanism 10 and second main transmission mechanism 11 is detected, and the detected shift position is displayed on the shift change display 64.

In the state described above, suppose the shift-up button 61 or shift-down button 62 is pushed (steps S15,S16). As shown with a solid line A1 (at a time point B1) in FIG. 10, when the shift-up button 61 is pushed (step S15), a clutch among from the first-fourth speed clutches 21-24 which is one speed higher than the shift position at present starts to be operated by the corresponding solenoid valves 31*b*-34*b* to a transmission state (a pressure starts to be raised from a working pressure of a cut-off state) (step S17). When the shift-down button 62 is pushed (step S16), a clutch among from the first-fourth speed clutches 21-24 which is one speed lower than the shift position at present starts to be operated by the solenoid valves 31*b*-34*b* to a transmission state (a pressure starts to be raised from a working pressure of a cut-off state) (step S18).

In this case, when the shift lever 28 is at the low-speed position L or the high-speed position H (step S19), and the first mode control module 81 is activated (M-Flag="1") in the step S20, the predetermined low pressure P3 is set in the following manner (step S24).

There has been obtained in advance a relationship between a rotational speed of the engine 1 in a non-load state (a state in which the forward clutch 5 and reverse clutch 6 are in cut-off state, and at the same time, the PTO clutch 3 is in a cut-off state, and thus no load is on the engine 1) and an operation position of the accelerator hand lever 73 (detected value by the gate opening sensor 75).

Based on an operation position of the accelerator hand lever 73 (detected value by the gate opening sensor 75), a rotational speed N1 of the engine 1 in a non-load state is obtained with reference to the relationship described above (step S21), while the rotational speed sensor 72 calculates the actual rotational speed N2 of the engine 1 (step S22). A difference (rotational speed difference N3) between the rotational speed N1 of the engine 1 in a non-load state and a detected value by the rotational speed sensor 72 (actual rotational speed N2 of the engine 1) is computed (step S23), and based on this rotational speed difference N3, the predetermined low pressure P3 is set (step S24) (for example, for a larger rotational speed difference N3, it is determined that a load on the engine 1 is larger, and the predetermined low pressure P3 is set to a higher-pressure side. For a smaller rotational speed difference N3, it is determined that a load on the engine 1 is smaller, and the predetermined low pressure P3 is set to a lower-pressure side (see a solid line A2 in FIG. 10)).

When the shift lever 28 is at the low-speed position L or the high-speed position H (step S19), and the second mode control module 82 (isochronous control module) is activated (M-Flag="2") in the step S20, the predetermined low pressure P3 is set in the following manner (step S25).

When the second mode control module 82 (isochronous control module) is activated, the detected value by the rotational speed sensor 72 (actual rotational speed N2 of the engine 1) hardly changes, and a difference (rotational speed difference N3) between the rotational speed N1 of the engine 1 in a non-load state and the detected value by the rotational speed sensor 72 (actual rotational speed N2 of the engine 1) scarcely occurs. However, a fuel injection amount by the fuel injection control unit 68 varies when the second mode control module 82 (isochronous control module) is activated, and thus a load on the engine is determined based on the fuel injection amount.

Based on a fuel injection amount, the predetermined low pressure P3 is set (step S25) (for example, for a larger fuel injection amount, it is determined that a load on the engine 1 is larger, and the predetermined low pressure P3 is set to a higher-pressure side. For a smaller fuel injection amount, it is determined that a load on the engine 1 is smaller, and the predetermined low pressure P3 is set to a lower-pressure side (see the solid line A2 in FIG. 10)).

Next, a second half of operation of the first main transmission mechanism 10 and second main transmission mechanism 11 by pushing the shift-up button 61 or shift-down button 62 will be described.

Figure 10:
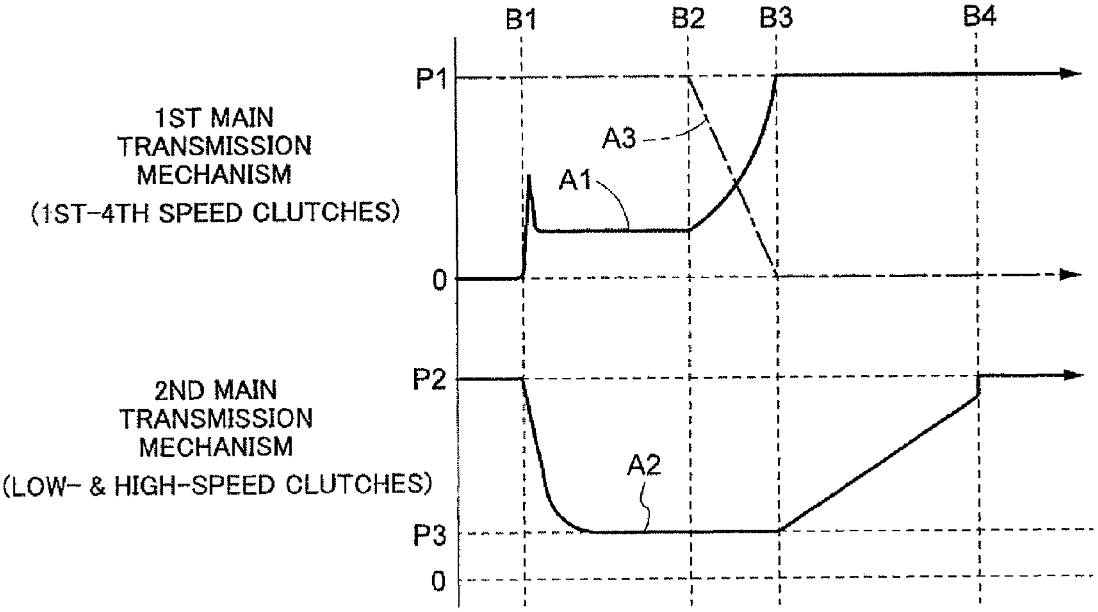
FIG. 10 is a diagram showing pressure states of first speed-fourth speed clutches and pressure states of low-speed and high-speed clutches, when the shift-up button or shift-down button is operated.

When the predetermined low pressure P3 is set as described above (steps S24 and S25), as shown with the solid line A2 (at the time point B1) in FIG. 10, a working pressure of the low-speed clutch 26 or high-speed clutch 27 in a transmission state is reduced from a working pressure P2 of a transmission state to the predetermined low pressure P3, by the solenoid proportional valves 38,39 (step S26). In this case, when the clutch shift is performed from the fourth-speed shift position to the fifth-speed shift position, a working pressure of the low-speed clutch 26 is reduced to zero, and a working pressure of the high-speed clutch 27 is raised from zero to the predetermined low pressure P3. Adversely, when the clutch shift is performed from the fifth-speed shift position to the fourth speed shift position, a working pressure of the high-speed clutch 27 is reduced to zero, and a working pressure of the low-speed clutch 26 is raised from zero to the predetermined low pressure P3.

As shown with the solid line A1 (from a time point B2 to a time point B3) in FIG. 10, a working pressure of a clutch among from the first speed-fourth speed clutches 21-24 which is one speed higher or lower starts to be raised to a working pressure P1 of a transmission state by the solenoid valves 3 1*b*-34*b* (due to the continuous implementation of the steps S17,S18). At the same time, as shown with a dashed-dotted line A3 (from the time point B2 to the time point B3) in FIG. 10, a working pressure of the first speed-fourth speed clutches 21-24 before pressing the shift-up button 61 or shift-down button 62 (the first speed-fourth speed clutches 21-24 which has been in a transmission state before pushing the shift-up button 61 or shift-down button 62) is reduced from the working pressure P1 of a transmission state to zero by the solenoid valves 31*b*-34*b* (step S27).

When the shift lever 28 is at the low-speed position L or high-speed position H (step S28), as shown with the solid line A2 (from the time point B3 to a time point B4) in FIG. 10, a working pressure of the low-speed clutch 26 or high-speed clutch 27 is gradually raised from the predetermined low pressure P3 by the corresponding solenoid proportional valves 38,39 (step S29). With this configuration, power of the above-mentioned clutch among from the first speed-fourth speed clutches 21-24 which is one speed higher or lower starts to be transmitted through the low-speed clutch 26 or high-speed clutch 27.

When the pressure sensor 63 detects that the working pressure of the low-speed clutch 26 or high-speed clutch 27 reached the working pressure P2 of a transmission state (step S30) as shown with the solid line A2 (at the time point 134) in FIG. 10, it is determined that the shift operation by pushing the shift-up button 61 or shift-down button 62 is completed, and a shift position after shift operation is displayed on the shift change display 64 (step S31), and then the buzzer 71 is activated once to inform the driver of a completion of the shift operation (step S32). After this process, the processing advances to the step S11, and next shift operation by pushing the shift-up button 61 or shift-down button 62 becomes capable.

When the shift lever 28 is at a neutral position N, the auxiliary transmission mechanism 12 (shift member 53) is at a neutral position, and thus the vehicle body is stopped. When the shift lever 28 is at the neutral position N and the shift-up button 61 or shift-down button 62 is pushed (steps S15,S16), as described above, the first main transmission mechanism 10 and second main transmission mechanism 11 (first speed-fourth speed clutches 21-24, low-speed and high-speed clutch 26,27) is shifted by one speed to a higher side or lower side (step S17,S18,S27), and a shift position after shift operation is displayed on the shift change display 64 (step S31), and then the buzzer 71 is activated once (step S32).

Since the vehicle body is stopped in this case, unlike the steps S20-S26,S29, no pressure operation is performed, such as reducing of a working pressure of the low-speed clutch 26 or high-speed clutch 27 to the predetermined low pressure P3, and rising of a work pressure to the working pressure P2 of the transmission state (steps S19,S28).

Next, an operation of the auxiliary transmission mechanism 12 using the shift lever 28 will be described.

As shown in FIG. 2, when the shift lever 28 is at a neutral position N, the auxiliary transmission mechanism 12 (shift member 53) is at a neutral position. When the shift lever 28 is at the low-speed position L, the auxiliary transmission mechanism 12 (shift member 53) is at a low-speed position. When the shift lever 28 is at the high-speed position H, the auxiliary transmission mechanism 12 (shift member 53) is at a high-speed position.

For example, when the forward-reverse lever 59 is at the forward position F (the forward clutch 5 is in a transmission state and the reverse clutch 6 is in a cut-off state), in the case where the shift lever 28 is at the low-speed position L (or high-speed position H) (the shift lever 28 is retained at the low-speed position L (or high-speed position H) by the manual operation button 57 and lock pin 56), by pushing the manual operation button 57 to retract the lock pin 56 from the guide plate 60, the solenoid valve 36*b* allows the switching valve 36*a* to shift to an oil-drain position, by which the forward clutch 5 is shifted to a cut-off state.

With this configuration, while pushing the manual operation button 57, the shift lever 28 can be shifted from the low-speed position L (or high-speed position H) to the neutral position N, then to the high-speed position H (or low-speed position L), and while returning the manual operation button 57, the shift lever 28 can be retained at the neutral position N or high-speed position H (or low-speed position L) by the lock pin 56.

When the shift lever 28 is at the neutral position N and the manual operation button 57 is returned, the solenoid valve

36*b* allows the switching valve 36*a* to shift to a supply position, and the solenoid proportional valve 35 shifts the forward clutch 5 immediately to a transmission state. When the shift lever 28 is at the high-speed position H (or low-speed position L) and the manual operation button 57 is returned, the solenoid valve 36*b* allows the switching valve 36*a* to shift to a supply position, and the solenoid proportional valve 35 shifts the forward clutch 5 gradually to a transmission state.

When the forward-reverse lever 59 is at the reverse position R (the reverse clutch 6 is in a transmission state and the forward clutch 5 is in a cut-off state) and the manual operation button 57 of the shift lever 28 is pushed or returned as described above, the reverse clutch 6 is likewise shifted to a cut-off state or a transmission state.

First Modified Embodiment

In the embodiment described above, like the second main transmission mechanism 11, the auxiliary transmission mechanism 12 shown in FIG. 1 may be provided with a low-speed clutch (not shown) and a high-speed clutch (not shown) of hydraulic multiple-disc type arranged adjacent to each other, and with a solenoid proportional valve (not shown) for each of the low-speed clutch and high-speed clutch of the auxiliary transmission mechanism 12. With this configuration, through the first main transmission mechanism 10, second main transmission mechanism 11 and auxiliary transmission mechanism 12, first speed-sixteenth speed shift positions can be set, and by pushing the shift-up button 61 or shift-down button 62, the speed shift can be changed among first speed-sixteenth speed shift positions.

Second Modified Embodiment

The above-described first main transmission mechanism 10 and second main transmission mechanism 11 shown in FIG. 1 are hydraulic clutch type, and alternatively, like the auxiliary transmission mechanism 12, each of the first main transmission mechanism 10 and second main transmission mechanism 11 may be of gear shift type with a shift member (not shown) slidably operable by the hydraulic cylinder (not shown).

The present invention may be applied to a work vehicle with the first main transmission mechanism 10 and the second main transmission mechanism 11 having tenth-speed or sixth-speed shift positions, and alternatively a work vehicle with the auxiliary transmission mechanism 12 having third-speed shift positions, including a high-speed position, a medium-speed position and a low-speed position.

The present invention may be applied to a work vehicle in which the first main transmission mechanism 10 and second main transmission mechanism 11 are automatically shifted based on a difference (rotational speed difference N3) between the rotational speed N1 of the engine 1 in a non-load state and the detected value by the rotational speed sensor 72 (actual rotational speed N2 of the engine 1), or based on the fuel injection amount.

What is claimed is:

1. An engine controller for a work vehicle connected to: an operation position detection sensor configured to detect an operation position of an acceleration manually operating device; a rotational speed sensor configured to detect a rotational speed of an engine; and a fuel injection control unit configured to control a fuel injection amount in the engine, the controller comprising:

a first mode control module configured to perform a first mode control in which the fuel injection amount is obtained based on a first torque-engine rotational speed characteristic;

a second mode control module configured to perform a second mode control in which the fuel injection amount is obtained based on a second torque-engine rotational speed characteristic in which a change in rotational speed along with a change in torque is smaller than that of the first torque-engine rotational speed characteristic;

a control mode management unit configured to make a selection between the first mode control and the second mode control;

a difference computing unit configured to compute a difference in rotational speed between a non-load engine rotational speed for the operation position detected by the operation position detection sensor and the engine rotational speed from the rotational speed sensor, the non-load engine rotational speed being defined for each operation position;

a first engine load estimation part configured to estimate an engine load based on the difference in rotational speed, while the first mode control is performed, and a second engine load estimation part configured to estimate an engine load based on the fuel injection amount, while the second mode control is performed.

2. The controller according to claim 1, wherein the second mode control is an isochronous control.

3. The controller according to claim 1, further comprising an operational behavior evaluation unit configured to evaluate an operational behavior of the acceleration operating device based on a detection signal by the operation position detection sensor, wherein when the operational behavior evaluation unit determines that an operation amount per unit time of the acceleration operating device is large, the first mode control is forcibly selected, and when the operational behavior evaluation unit determines that the operation amount per unit time of the acceleration operating device is small, the second mode control is forcibly selected.

4. The controller according to claim 1, wherein when it is determined that there is a rapid acceleration or deceleration during the second mode control, the first engine load estimation part estimates an engine load.

5. The controller according to claim 1, wherein when the fuel injection amount is in a maximal domain during the second mode control, the first engine load estimation part estimates an engine load.

6. The controller according to claim 1, wherein the work vehicle is provided with a mode manually setting device, and the control mode management unit makes a selection between the first mode control and the second mode control, based on mode setting information from the mode setting device.

* * * * *

UNITED STATES PATENT AND TRADEMARK OFFICE

CERTIFICATE OF CORRECTION

PATENT NO. : 7,941,263 B2
APPLICATION NO. : 12/411053
DATED : May 10, 2011
INVENTOR(S) : Nishi et al.

It is certified that error appears in the above-identified patent and that said Letters Patent is hereby corrected as shown below:

Claim 1, Col. 14, lines 26-29, text beginning with "a second engine load" to end of claim should appear as a separate paragraph Signed and Sealed this
Fourth Day of October, 2011

David J. Kappos
*Director of the United States Patent and Trademark Office*